United States Patent Office 3,321,487
Patented May 23, 1967

3,321,487
ORGANO ALUMINUM COMPOUNDS AND
METHOD FOR OBTAINING THEM
Paolo Chini and Agostino Baradel, Milan, Italy, assignors to SNAM—Societa per Azioni
No Drawing. Filed Nov. 9, 1961, Ser. No. 151,177
Claims priority, application Italy, Nov. 16, 1960, 8,175/60, Patent 642,038
21 Claims. (Cl. 260—340.6)

The present invention relates to organo-aluminum compounds derived from acetylene.

Acetylene derivatives of alkaline-earth metals and alkali metals are known and may be employed in a great number of organic syntheses. Prior to the present invention no compounds of this type containing aluminum were known. This compound $Al_4C_3$, which with water develops methane, cannot be considered a derivative of acetylene. Moreover, while aluminum alkyls and aryls are well-known compounds widely employed in the field of organic synthesis, there is known only one compound containing aluminum directly bound to an alkyl acetylene group, namely the compound having the formula:

$$Al(C_2H_5)_2.C\equiv C-C_2H_5$$

(G. Wilke and H. Miller Ber. 629.222 (1960)).

Now it has been surprisingly found that it is possible to prepare in stable form, by very simple and convenient processes, organo-aluminum compounds with acetylene.

In accordance with the present invention there is provided an organo-aluminum compound having one of the following general formulae:

(a) $Al(C\equiv CH)_3.Z_n$ (b) $Al(C\equiv CH)_{3-m}X_m\cdot Z_n$ (c) $MAl(C\equiv CH)_4.Z_y$ wherein:

Z is an amine or ether, X is a hydrogen or halogen atom or an alkyl, aryl or alkoxy group, $n$ is 1 or 2, $m$ is 1 or 2, $y$ is 0, 1 or 2 and M is lithium, sodium or potassium.

According to the present invention the compounds of formulae (a) and (b) may be prepared by reacting an alkali metal acetylide with an aluminum halide or an aluminum compound of the general formula $$AlX_mX'_{(3-m)}$$

wherein X is a hydrogen or halogen atom or an alkyl, aryl or alkoxy group, X' is a halogen atom and $m$ is 1 or 2, in the presence of an ether or an amine.

Some examples of ethers and amines that can be employed are the following: tetrahydrofuran, dioxan, diethyl ether, ethylene, glycol dimethyl ether, ethylene glycol diethyl ether and diethylene glycol dimethyl ether, pyridine, quinoline, triethyl amine, tri-n-butyl amine and trimethyl amine and dimethyl aniline.

The above compounds can be employed pure as well as diluted or in admixture with each other.

In a preferred embodiment the preparation is conducted by reacting the acetylide of lithium, sodium or potassium with aluminum chloride or aluminum bromide at a temperature between 0° C. and 100° C. employing the reactants in stoichiometric quantities. The reaction takes place according to the following equation:

$$AlCl_3+3MC\equiv CH+nZ\rightarrow Al(C\equiv CH)_3.Z_n+3MCl$$

wherein M, Z and $n$ have the meanings set out above.

During the reaction it is convenient to operate with a solvent saturated with acetylene. The compounds so obtained are white solids, soluble in the reaction medium, which are oxidized by air slowly and which react with water violently, with ignition. It should be noted that the compound $Al(C\equiv CH)_3.N(CH_3)_3$ can undergo sublimation at 60° C. to 90° C. under high vacuum.

By the process described above it is also possible to prepare compounds having the formula (b) provided the reaction is carried out with a ratio of aluminum halide to alkali metal acetylide of 1:1 to 1:2. The same compounds can be obtained by mixing in suitable stoichiometric ratio compounds of the formula $Al(C\equiv CH)_3.Z_n$ with compounds of the formula $AlX_3$ (where Z, $n$ and X have the aforesaid meanings) or starting from alkyl, aryl, alkoxy and hydrogen halides of aluminum by double exchange with an alkali metal acetylide.

Compounds of the general formula (c) can be obtained according to the present invention, by reacting lithium-aluminum hydride and acetylene, in the presence of an ether or of an amine and of a small amount of lithium hydride (generally between 0.01 and 1% of the $LiAlH_4$ employed).

The reaction is preferably conducted at a temperature between 0° C. and 100° C. in the presence of an excess of the acetylenic compound and takes place according to the equation:

$$LiAlH_4+4HC\equiv CH+nZ\rightarrow LiAl(C\equiv CH)_4.Z_n+4H_2$$

The compounds also can be obtained by mere addition of an aluminum acetylide to an alkali metal acetylide.

The products of the present invention are useful as catalysts in the polymerization of unsaturated compounds.

The following examples illustrate the present invention. All of the following preparations were carried out in an atmosphere of dry nitrogen. It is possible to operate also with another inert gas, such as argon, hydrogen or carbon dioxide.

Example 1

13.0 g. of sodium (0.56 gram-atoms) finely subdivided, suspended in a mixture of 100 cc. of ethyl benzene and 400 cc. of dioxan are converted into sodium acetylide by slow bubbling of acetylene at a temperature of 70° to 75° C., for 6 hours. The homogeneous white suspension so obtained is treated with 23.3 g. of aluminum chloride (0.52 gram-atoms of chlorine), added in five portions over a period of one hour. The operation is carried out while maintaining an atmosphere of acetylene in the flask and preventing the entrance of air. The reaction mixture is stirred for four hours at a temperature of 55° to 60° C. and is filtered. By evaporation of the filtrate at reduced pressure and drying, the residue at 0.1 to 0.2 torr there are obtained 23.7 g. of $Al(C\equiv CH)_3.C_4H_8O_2$ corresponding to 68% of theoretical yield.

Analysis.—Theoretical: Al, 14.18%; —C≡CH, 39.48%; dioxan, 46.34%. Found: Al, 13.4%; —C≡CH, 37.8%; dioxan, 50.0%.

Similarly the compound $Al(C\equiv CH)_3\cdot C_4H_8O$ has been prepared.

Analysis.—Theoretical: Al, 15.49%; —C≡CH, 43.15%; tetrahydrofuran, 41.36%. Found: Al, 14.9%; —C≡CH, 40.0%; tetrahydrofuran, 37.7%.

Example 2

To 3.2 g. of aluminum acetylide complexed with dioxan (0.015 mol) are added 25 cc. of trimethyl amine. The mixture is stirred under reflux for half an hour, and is then filtered. By evaporation of the filtrate and drying the residue, there is obtained a crude product, part of which is sublimed at 60° to 70° C. and 0.1 torr, to obtain crystals of $Al(C\equiv CH)_3\cdot N(CH_3)_3$.

Analysis.—Theoretical: Al, 19.69%; —C≡CH, 46.47%. Found: Al, 16.95%; —C≡CH, 48.62.

Similarly the compound $Al(C\equiv CH)_3\cdot 2C_5H_5N$ has been prepared.

*Analysis.*—Theoretical: Al, 10.32%; —C≡CH, 28.8%. Found: Al, 10.72%; —C≡CH, 29.8%.

*Example 3*

To 3.4 g. of Al(C≡CH)$_3$·C$_4$H$_8$O$_2$ dissolved in dioxan, there are added 6.0 g. of Al(C$_2$H$_5$)$_3$ dissolved in dioxan. The solution is evaporated until the weight is constant. The residue is a brownish-red limpid liquid, non-distillable, Al(C$_2$H$_5$)$_2$·(C≡CH)·C$_4$H$_8$O$_2$.

*Analysis.*—Theoretical: Al, 13.62%; —C≡CH, 12.63%; —C$_2$H$_5$, 29.33%. Found: Al, 14.65%; —C≡CH, 13.06%; 32.19%.

Similarly the compound Al(C$_2$H$_5$)(C≡CH)$_2$ has been prepared.

*Analysis.*—Theoretical: Al, 13.92%; —C≡CH, 25.77%; —C$_2$H$_5$, 14.98%. Found: Al, 14.26%; —C≡CH, 25.54%; —C$_2$H$_5$, 16.39%.

This latter compound has also been prepared starting from Al(C$_2$H$_5$)Cl$_2$ (1 mole) and NaC≡CH (2 moles) operating in dioxan at room temperature.

The infrared spectrum of the alkyl acetylenic compounds so prepared proves also that the products obtained correspond to the formulae written.

*Example 4*

5.3 g. of Al(C≡CH)$_3$·C$_4$H$_8$O$_2$ (0.072 equivalent of C≡CH) are dissolved in 40 cc. of dioxan and are treated with 24 cc. of a solution of aluminum chloride in dioxan (containing 0.036 gram-atoms of Cl). The mixture is heated to a temperature of 70° C. to 80° C. and is then filtered from the impurities and evaporated under vacuum. After drying at 0.2 torr there remains a product whose composition conforms to a ratio $$Al:C≡CH:Cl=1:1.7$$

1.1 and that essentially satisfies the formula $$Al(C≡CH)_2Cl·2C_4H_8O_2$$

Similarly a product was prepared having the ratio Al:C≡CH:Cl=1:0.87:2.13 and essentially conforming to the formula Al(C≡CH)Cl$_2$·C$_4$H$_8$O$_2$.

*Example 5*

A stream of acetylene is passed for two hours into a solution of 1 g. LiAlH$_4$ in 50 cc. of tetrahydrofuran. The operation is carried out at a temperature of 50° C. and the reaction is catalysed with 1% of LiH. A quantitative yield of LiAl(C≡CH)$_4$·C$_4$H$_8$O is obtained.

*Analysis.*—Theoretical: Al, 13.07%; C≡CH, 48.6%; Li, 4.84%. Found: Al, 13.62%; C≡CH, 50.3%; Li, 5.05%.

*Example 6*

NaAl(C≡CH)$_4$·Dioxan is obtained from NaC≡CH suspended in dioxan, by treatment with an excess of Al(C≡CH)$_3$·Dioxan. By filtration, washing and drying of the solid one obtains a slightly impure product containing (NaC≡CH), that is insoluble in dioxan and has the following analytical data:

*Analysis.*—Theoretical: Al, 10.95%; Na, 12.85%; —C≡CH, 47.61%; Dioxan, 28.6%. Found: Al, 9.9%; Na, 11.6%; —C≡CH, 43.1%; Dioxan, 32.2%.

We claim:

1. An organo-aluminum compound having the general formula $$M_p(C≡CH)_pAl(C≡CH)_{(3-q)}X_q·Z_y$$

wherein M is an alkali metal selected from the group consisting of lithium, sodium and potassium, X is a member of the group consisting of hydrogen, halogen, alkyl, aryl and alkoxy, Z is a member of the group consisting of ethers and amines, p is an integer from 0 to 1, q is an integer from 0 to 2, and y is an integer from 0 to 2, y being an integer from 1 to 2 when p is 0 and q being 0 when p is 1.

2. An organo-aluminum compound as claimed in claim 1 wherein Z is dioxan, p is 0 and y is 1.
3. An organo-aluminum compound as claimed in claim 1 wherein Z is tetrahydrofuran, p is 0 and y is 1.
4. An organo-aluminum compound as claimed in claim 1 wherein Z is trimethylamine, p is 0 and y is 1.
5. An organo-aluminum compound having the general formula $$Al(C≡CH)_{3-q}X_q·Z_n$$

wherein X is a member of the group consisting of hydrogen, halogen, alkyl, aryl and alkoxy, Z is a member of the group consisting of ethers and amines, q is an integer from 0 to 2, and n is an integer from 1 to 2.

6. An organo-aluminum compound having the general formula $$MAl(C≡CH)_4·Z_y$$

wherein M is an alkali metal selected from the group consisting of lithium, sodium and potassium, Z is a member of the group consisting of ethers and amines, and y is an integer from 0 to 2.

7. An organo-aluminum compound as claimed in claim 6 wherein M is lithium, Z is tetrahydrofuran and y is 1.
7. An organo-aluminum compound as claimed in claim 6 wherein M is sodium, Z is dioxan and y is 1.
9. A process for preparing a compound having the general formula $$Al(C≡CH)_{3-q}X_q·Z_n$$

wherein X, Z, q and n are as defined in claim 5, which comprises reacting an alkali metal acetylide with an aluminum compound of the general formula AlX$_m$X'$_{(3-m)}$ wherein X is a member of the group consisting of hydrogen, halogen, alkyl, aryl and alkoxy, X' is a halogen atom and m is an integer from 1 to 2 in the presence of a compound selected from the group consisting of ethers and amines.

10. A process as claimed in claim 9 wherein the reaction is conducted at a temperature within the range of 0° to 100° C.

11. A process for preparing a compound having the general formula Al(C≡CH)$_3$·Z$_n$ wherein Z and n are as defined in claim 5, which comprises reacting 3 moles of an alkali metal acetylide with 1 mole of an aluminum halide selected from the group consisting of aluminum chloride, aluminum bromide and aluminum iodide.

12. A process for preparing a compound having the general formula Al(C≡CH)$_{3-m}$X$_m$·Z$_n$ wherein X is a halogen, Z is a member of the group consisting of ethers and amines, m is an integer from 1 to 2 and n is an integer from 1 to 2 which comprises reacting an integral number of moles from 1 to 2 moles of alkali metal acetylide with 1 mole of an aluminum halide selected from the group consisting of aluminum chloride, aluminum bromide and aluminum iodide.

13. A process for preparing a compound having the general formula Al(C≡CH)$_{3-m}$X$_m$·Z$_n$ wherein X is a member of the group consisting of hydrogen, halogen, alkyl, aryl and alkoxy, Z, m and n are as defined in claim 12, which comprises reacting a compound of the general formula Al(C≡CH)$_3$·Z$_n$ with an aluminum compound having the general formula AlX$_3$ wherein X is a member of the group consisting of hydrogen, halogen, alkyl, aryl and alkoxy, in the presence of a compound selected from ethers and amines.

14. A process according to claim 13 wherein the reaction is conducted at a temperature within the range of 0° to 100° C.

15. A process for preparing a compound of the general formula MAl(C≡CH)$_4$·Z$_y$ wherein M is an alkali metal selected from the group consisting of lithium, sodium and potassium, Z is a member of the group consisting of ethers and amines and y is an integer from 0 to 2, which comprises reacting a compound selected from the group consisting of lithium acetylide, sodium acetylide and potassium acetylide with an aluminum acetylide.

16. A process for preparing a compound having the general formula $MAl(C{\equiv}CH)_4 \cdot Z_y$ wherein M is an alkali metal selected from the group consisting of lithium, sodium and potassium, Z is a member of the group consisting of ethers and amines and y is an integer from 0 to 2, which comprises reacting an alkali metal aluminum hydride with acetylene in the presence of a compound selected from the group consisting of ethers and amines.

17. A process according to claim 16 wherein the reaction is conducted at a temperature of 0° to 100° C.

18. A process for preparing a compound of the general formula $LiAl(C{\equiv}CH)_4 \cdot Z_y$ wherein Z is a member of the group consisting of ethers and amines and y is an integer from 0 to 2, which comprises reacting lithium aluminum hydride with acetylene in the presence of a compound selected from the group consisting of ethers and amines and in the presence of 0.01 to 1% of lithium hydride.

19. A process according to claim 18 wherein the reaction is conducted at a temperature of 0° to 100° C.

20. A process according to claim 18, wherein a stream of acetylene is passed into a solution of $LiAlH_4$ in tetrahydrofuran, and in the presence of lithium hydride.

21. A process according to claim 20, wherein the solution comprises 1 g. of $LiAlH_4$ in 50 cc. of tetrahydrofuran, the operation is carried out at 50° C., and the reaction is catalysed with 1% of lithium hydride.

References Cited by the Examiner

UNITED STATES PATENTS 3,020,298   2/1962   Ashby _____ 260—448

TOBIAS E. LEVOW, *Primary Examiner.*

H. M. S. SNEED, *Assistant Examiner.*